US011452127B2

(12) United States Patent
Liu et al.

(10) Patent No.: US 11,452,127 B2
(45) Date of Patent: Sep. 20, 2022

(54) NETWORK RESOURCE SCHEDULING METHOD AND APPARATUS

(71) Applicant: HUAWEI TECHNOLOGIES CO., LTD., Shenzhen (CN)

(72) Inventors: Bing Liu, Beijing (CN); Mingui Zhang, Beijing (CN); Yuefeng Wu, Nanjing (CN); Huanqing Huang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 17/162,233

(22) Filed: Jan. 29, 2021

(65) Prior Publication Data

US 2021/0153233 A1    May 20, 2021

Related U.S. Application Data

(63) Continuation of application No. PCT/CN2019/098311, filed on Jul. 30, 2019.

(30) Foreign Application Priority Data

Aug. 2, 2018 (CN) .......................... 201810872232.4

(51) Int. Cl.
*H04W 72/12* (2009.01)
*H04W 28/26* (2009.01)
(52) U.S. Cl.
CPC ....... *H04W 72/1278* (2013.01); *H04W 28/26* (2013.01); *H04W 72/1205* (2013.01)
(58) Field of Classification Search
CPC ............. H04W 72/1278; H04W 28/26; H04W 72/1205
See application file for complete search history.

(56) References Cited

U.S. PATENT DOCUMENTS

2011/0170480 A1\* 7/2011 Pi ........................... H04W 48/12
370/328
2011/0228696 A1    9/2011 Agarwal et al.
(Continued)

FOREIGN PATENT DOCUMENTS

CN    101179361 A    5/2008
CN    101217499 A    7/2008
(Continued)

OTHER PUBLICATIONS

IEEE Std 802.15.4tm 2011, IEEE Standard for Local and metropolitan area networks—Part 15.4: Low-Rate Wireless Personal Area Networks (LR-WPANs), Sep. 5, 2011, total 314 pages.

(Continued)

*Primary Examiner* — Ajay Cattungal
(74) *Attorney, Agent, or Firm* — Rimon PC

(57) ABSTRACT

This application discloses a network resource scheduling method and an apparatus. A scheduling process includes receiving, by a first network node, a message, where the message includes a network resource that needs to be scheduled between a plurality of network nodes on a multi-hop path. After resource scheduling is performed between the first network node and a second network node, the message is sent to the second network node, to trigger network resource scheduling between the second network node and a third network node. Therefore, end-to-end resource scheduling can be implemented using one message, and end-to-end resource reservation on the multi-hop path can be implemented.

17 Claims, 5 Drawing Sheets

(56) References Cited

U.S. PATENT DOCUMENTS

| | | | |
|---|---|---|---|
| 2012/0281573 A1* | 11/2012 | Kazmi | H04L 1/00 370/252 |
| 2016/0373972 A1* | 12/2016 | Vesely | H04W 36/0069 |
| 2017/0099662 A1 | 4/2017 | Thubert et al. | |
| 2017/0331577 A1* | 11/2017 | Parkvall | H04W 4/00 |
| 2018/0026891 A1 | 1/2018 | Vasseur et al. | |
| 2018/0152377 A1 | 5/2018 | Wetterwald et al. | |
| 2018/0213459 A1 | 7/2018 | Chen et al. | |
| 2018/0249365 A1* | 8/2018 | Cho | H04W 72/12 |
| 2018/0368140 A1* | 12/2018 | Centonza | H04W 72/0426 |
| 2019/0014040 A1* | 1/2019 | Yerrapureddy | H04L 12/28 |
| 2019/0182874 A1* | 6/2019 | Cho | H04W 28/0268 |
| 2019/0313475 A1* | 10/2019 | Siomina | H04W 48/16 |
| 2020/0099742 A1* | 3/2020 | Puente Pestaña et al. | H04L 67/1076 |

FOREIGN PATENT DOCUMENTS

| | | |
|---|---|---|
| CN | 102158966 A | 8/2011 |
| CN | 102972077 A | 3/2013 |
| CN | 103380650 A | 10/2013 |
| JP | 2009206814 A | 9/2009 |
| JP | 2017143466 A | 8/2017 |
| JP | 2017528956 A | 9/2017 |
| WO | 2009157829 A1 | 12/2009 |
| WO | 2016019291 A1 | 2/2016 |

OTHER PUBLICATIONS

Q. Wang, Ed. et al, 6TiSCH Operation Sublayer Protocol (6P), draft-ietf-6tisch-6top-protocol-12, 6TiSCH Internet—Draft, Jun. 20, 2018, total 47 pages.

D. Dujovne, Ed. et al, 6TiSCH 6top Scheduling Function Zero (SF0), draft-ietf-6tisch-6top-sf0-05, 6TiSCH Internet—Draft, Jul. 2, 2017, total 14 pages.

S. Anamalamudi et al, Scheduling Function One (SF1): hop-by-hop Scheduling with RSVP-TE in 6tisch Networks, draft-satish-6tisch-6top-sf1-04, 6TiSCH Internet—Draft, Oct. 27, 2017, total 14 pages.

Request for Comments: 4443, A. Conta et al, Internet Control Message Protocol (ICMPv6), for the Internet Protocol Version 6 (IPv6) Specification, Network Working Group, Mar. 2006, total 24 pages.

Request for Comments: 6550, T. Winter, Ed. et al, RPL: IPv6 Routing Protocol for Low-Power and Lossy Networks, Internet Engineering Task Force (IETF), Mar. 2012, total 157 pages.

* cited by examiner

NETWORK RESOURCE SCHEDULING METHOD AND APPARATUS

CROSS-REFERENCE TO RELATED APPLICATIONS

This application is a continuation of International Application No. PCT/CN2019/098311, filed on Jul. 30, 2019, which claims priority to Chinese Patent Application No. 201810872232.4, filed on Aug. 2, 2018. The disclosures of the aforementioned applications are hereby incorporated by reference in their entireties.

TECHNICAL FIELD

This application relates to the field of communications technologies, and in particular, to a network resource scheduling method and an apparatus.

BACKGROUND

In a time slotted channel hopping (TSCH) mode, a network resource may be divided in two dimensions: slot and channel, and one unit of formed network resource is referred to as a cell. The cell may be determined based on the slot and a channel shift. For example, the cell may be one unit of network bandwidth.

The internet engineering task force (IETF) 6TiSCH working group designs a 6top (6TiSCH Operation Sublayer) adaptation layer for the TSCH mode. Two adjacent nodes invoke 6P transaction signaling at a 6top to add (ADD), delete (DELETE), or relocate (RELOCATE) a cell. However, this method is applicable to network resource negotiation and scheduling between two adjacent nodes in only one hop, and cannot implement resource reservation on a multi-hop path.

SUMMARY

To resolve a technical problem, embodiments of this application provide a network resource scheduling method and an apparatus, to resolve a technical problem that resource reservation on a multi-hop path cannot be implemented.

According to a first aspect, an embodiment of this application provides a network resource scheduling method. The method includes: receiving, by a first network node, a message, where the message includes an identifier of the first network node, an identifier of a second network node, an identifier of a third network node, first resource information, and second resource information; the first resource information is a network resource that needs to be scheduled between the first network node and the second network node; and the second resource information is a network resource that needs to be scheduled between the second network node and the third network node; when determining that the message includes the identifier of the first network node, obtaining, by the first network node, the first resource information, and performing network resource scheduling with the second network node based on the first resource information; and sending, by the first network node, the message to the second network node, to trigger the second network node to perform network resource scheduling with the third network node based on the second resource information. The second network node is a next-hop network node of the first network node, and the third network node is a next-hop network node of the second network node.

According to the foregoing method, the first network node receives the message, where the message includes a network resource that needs to be scheduled between a plurality of network nodes on a multi-hop path; and after resource scheduling is performed between the first network node and the second network node, sends the message to the second network node, to trigger network resource scheduling between the second network node and the third network node, so that end-to-end resource scheduling is implemented by using one message, and end-to-end resource reservation on the multi-hop path can be implemented.

In some possible implementations, the sending, by the first network node, the message to the second network node may include: after determining that network resource scheduling between the first network node and the second network node succeeds, adding, by the first network node, a first indication identifier to the message, and sending, to the second network node, the message to which the first indication identifier is added, where the first indication identifier is used to indicate that network resource scheduling between the first network node and the second network node succeeds.

In an implementation, if the third network node is an egress node on a packet forwarding path, the message may be sent to the third network node and then be sent by the third network node to a network management device.

It may be understood that the first resource information is specifically used to indicate a candidate network resource that needs to be scheduled between the first network node and the second network node, the first indication identifier is further used to indicate a network resource that is successfully scheduled between the first network node and the second network node, and the successfully scheduled network resource may be selected from the candidate network resource.

In some possible implementations, the network resource scheduling method may further include: after determining that network resource scheduling between the first network node and the second network node fails, adding, by the first network node, a second indication identifier to the message, and sending, to the network management device, the message to which the second indication identifier is added, where the second indication identifier is used to indicate that network resource scheduling between the second network node and the second network node fails.

The message in this embodiment of this application may be a destination advertisement object (DAO) message.

In an example, the identifier of the first network node, the identifier of the second network node, the identifier of the third network node, the first resource information, and the second resource information are all carried in an option field in the DAO message.

In specific implementation, the option field includes a first target option field, a second target option field, a third target option field, a first schedule reservation option field, and a second schedule reservation option field. The first schedule reservation option field is located between the first target option field and the second target option field, and the second schedule reservation option field is located between the second target option field and the third target option field. The first target option field carries the identifier of the first network node, the second target option field carries the identifier of the second network node, the third target option field carries the identifier of the third network node, the first schedule reservation option field carries the first resource information, and the second schedule reservation option field carries the second resource information.

According to a second aspect, an embodiment of this application further provides a network node. The network node is a first network node, and includes a receiving unit, a scheduling unit, and a first sending unit. The receiving unit is configured to receive a message, where the message includes an identifier of the first network node, an identifier of a second network node, an identifier of a third network node, first resource information, and second resource information; the first resource information is a network resource that needs to be scheduled between the first network node and the second network node; and the second resource information is a network resource that needs to be scheduled between the second network node and the third network node. The scheduling unit is configured to: when the first network node determines that the message includes the identifier of the first network node, obtain the first resource information, and perform network resource scheduling with the second network node based on the first resource information. The first sending unit is configured to send the message to the second network node, to trigger the second network node to perform network resource scheduling with the third network node based on the second resource information.

In some possible implementations, the first sending unit may include: an adding subunit, configured to add a first indication identifier to the message after the first network node determines that network resource scheduling between the first network node and the second network node succeeds; and a sending subunit, configured to send, to the second network node, the message to which the first indication identifier is added, where the first indication identifier is used to indicate that network resource scheduling between the first network node and the second network node succeeds.

In an implementation, if the third network node is an egress node on a packet forwarding path, the message is sent to the third network node and then is sent by the third network node to a network management device.

The first resource information is specifically used to indicate a candidate network resource that needs to be scheduled between the first network node and the second network node, the first indication identifier is further used to indicate a network resource that is successfully scheduled between the first network node and the second network node, and the successfully scheduled network resource is selected from the candidate network resource.

In specific implementation, the network node may further include: a second sending unit, configured to: after it is determined that network resource scheduling between the first network node and the second network node fails, add a second indication identifier to the message, and send, to the network management device, the message to which the second indication identifier is added, where the second indication identifier is used to indicate that network resource scheduling between the second network node and the second network node fails.

The message in this embodiment of this application may be a destination advertisement object (DAO) message.

In an example, the identifier of the first network node, the identifier of the second network node, the identifier of the third network node, the first resource information, and the second resource information are all carried in an option field in the DAO message.

In specific implementation, the option field includes a first target option field, a second target option field, a third target option field, a first schedule reservation option field, and a second schedule reservation option field. The first schedule reservation option field is located between the first target option field and the second target option field, and the second schedule reservation option field is located between the second target option field and the third target option field. The first target option field carries the identifier of the first network node, the second target option field carries the identifier of the second network node, the third target option field carries the identifier of the third network node, the first schedule reservation option field carries the first resource information, and the second schedule reservation option field carries the second resource information.

The foregoing describes the network node provided in this embodiment of this application. For a specific implementation, refer to the description in the foregoing embodiment of the network resource scheduling method provided in the first aspect. An effect achieved in this embodiment is the same as that achieved in the foregoing method embodiment. Details are not described herein again.

According to a third aspect, an embodiment of this application further provides a network node, including at least one connected processor and a memory. The memory is configured to store program code, and the processor is configured to invoke the program code in the memory to perform the network resource scheduling method according to the first aspect.

According to a fourth aspect, an embodiment of this application further provides a computer readable storage medium, including an instruction. When the instruction is run on a computer, the computer is enabled to perform the network resource scheduling method according to the first aspect.

According to a fifth aspect, an embodiment of this application further provides a computer program product including an instruction. When the computer program product is run on a computer, the computer is enabled to perform the network resource scheduling method according to the first aspect.

BRIEF DESCRIPTION OF DRAWINGS

To describe the technical solutions in the embodiments of this application more clearly, the following briefly describes the accompanying drawings required for describing the embodiments. It is clear that the accompanying drawings in the following description show merely some embodiments recorded in this application, and a person of ordinary skill in the art may derive other drawings from these accompanying drawings.

DESCRIPTION OF EMBODIMENTS

Figure 1:
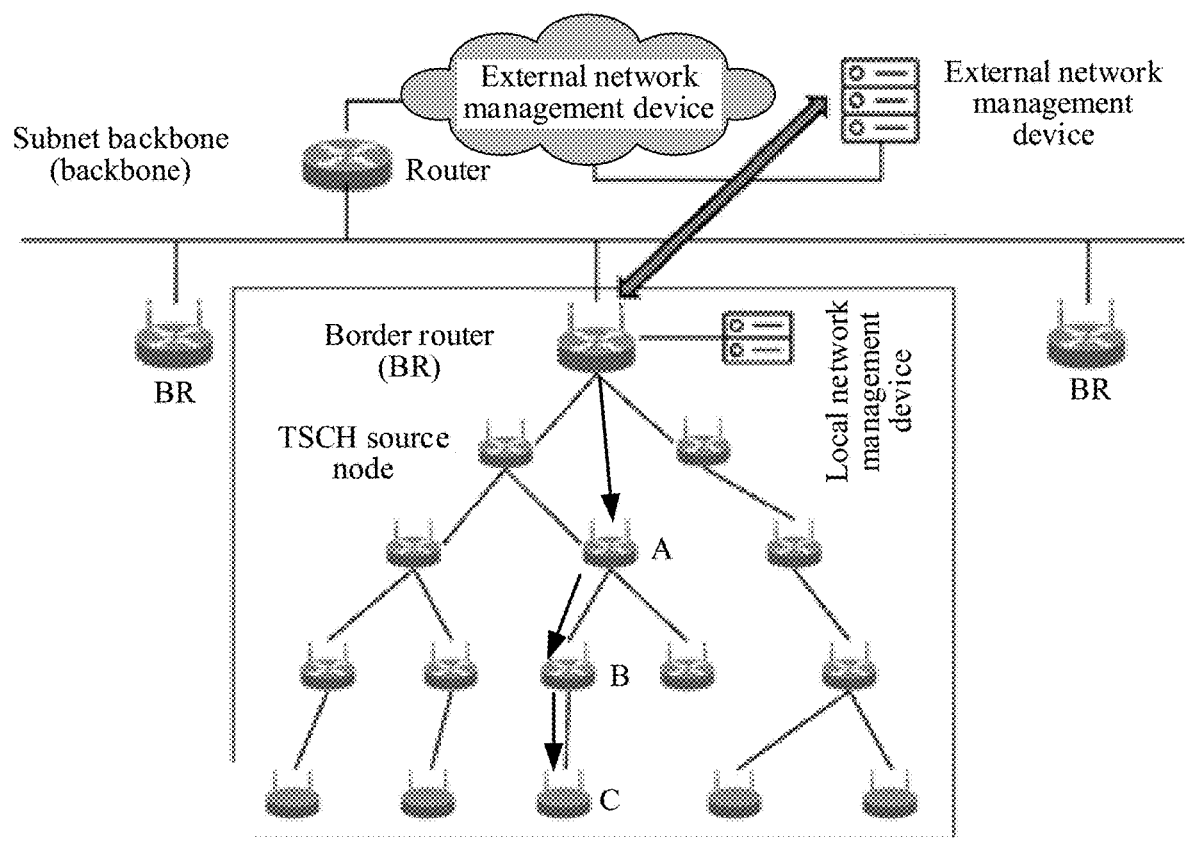
FIG. 1 is a schematic diagram of a framework of a network system in an application scenario according to an embodiment of this application.

Usually, to perform efficient and orderly packet receiving and sending between network nodes, a network resource needs to be configured for each network node on a packet receiving and sending path. The network nodes may communicate with each other in a same slot by using different channels and do not interfere with each other, provided that the network resource is properly scheduled.

It may be understood that the 6TiSCH working group defines a scheduling function (Scheduling Function) to schedule a network resource in a TSCH mode. Specifically, a cell between two adjacent network nodes may be dynamically scheduled based on a quantity (SCHEDULED CELLS) of reserved cells between the two adjacent network nodes, a quantity (REQUIRED CELLS) of cells required by network traffic, and a threshold SFXTHRESH. A quantity of cells actually used between adjacent network nodes is denoted as USED CELLS. An overprovisioning parameter is denoted as OVER PROVISION. Herein, REQUIRED CELLS=USED CELLS+OVER PROVISION. Specifically, a policy of scheduling the cell between the two adjacent network nodes may be as follows: If REQUIRED CELLS<(SCHEDULED CELLS−SFXTHRESH), it indicates that the quantity of reserved cells is excessively large and the cell needs to be deleted, and therefore one or more cells are deleted; if (SCHEDULED CELLS−SFXTHRESH)<=REQUIRED CELLS<=SCHEDULED CELLS, it indicates that the quantity of reserved cells is appropriate and does not need to be increased or decreased; or if SCHEDULED CELLS<REQUIRED CELLS, it indicates that the quantity of reserved cells is too small and the cell needs to be added, and therefore one or more cells are added. After the foregoing decision is completed, the two adjacent network nodes may directly invoke 6P transaction signaling at a 6top adaptation layer to configure the cell.

However, in some application scenarios, a packet is required to arrive at a destination end from a source end in a determined time. For example, in automatic control, an input signal needs to arrive at a controller in a closed-loop period of this control. Otherwise, the control may be in an unstable state. However, in a cell configuration manner in which independent negotiation and scheduling are performed between two adjacent network nodes (also referred to as one hop), only effective receiving and sending of a packet between the two adjacent network nodes in each hop can be ensured. For a multi-hop path, receiving and sending times of the packet at each network node on the path cannot be centrally scheduled and controlled. Consequently, each network node on the path may not receive and send the packet at a specified time, and therefore it is difficult to ensure that receiving and sending of the packet from a source end to a destination end on the path are completed in a deterministic latency. To be specific, the solution in which independent negotiation and scheduling are performed between the two adjacent nodes in one hop and that is provided for cell configuration cannot be applicable to cell scheduling on the multi-hop path. Even if a complete path is divided into a plurality of independent single-hop processes for processing, centralized scheduling of the cell from the source end to the destination end cannot be ensured.

Based on this, to resolve the foregoing technical problem, an embodiment of this application provides a network resource scheduling method. A message is sent to each network node on a packet forwarding path, to initiate centralized scheduling of a network resource on the packet forwarding path. For each hop network node on the packet forwarding path, a network node that receives the message may obtain target resource scheduling information between the network node and a next-hop network node from the message. In this case, the network node may perform network resource negotiation and scheduling with the next-hop network node based on the obtained target resource scheduling information. After network resource negotiation and scheduling of the network node succeed, the network node sends the message to the next-hop network node, the next-hop network node completes the network resource negotiation and scheduling of the next-hop network node in the foregoing manner, and by analogy, until all nodes on the packet forwarding path complete the network resource negotiation and scheduling. The message may be a DAO message. It can be learned that according to the network resource scheduling method provided in this embodiment of this application, the message (for example, the DAO message) is centrally delivered to each network node on the packet forwarding path, so that a network resource that needs to be scheduled between each pair of adjacent network nodes on a multi-hop path can be centrally scheduled, to resolve a problem that when independent network resource scheduling is performed by each hop network node, the network resource on the multi-hop path cannot be centrally scheduled and controlled, and consequently a packet cannot be received or sent on the path at a specified time, so that it can be ensured that a deterministic latency can be maintained for the packet from a source end to a destination end on the multi-hop path.

It may be understood that a routing protocol used in this embodiment of this application is the IPv6 routing protocol for low power and lossy networks (RPL for short) (RFC6550). The DAO message is defined in RPL. The DAO message is a unicast message, and is used by a child network node to send path information to a parent network node or a border router, so as to construct a downlink route. Based on this, in this embodiment of this application, a reversely propagated scheduling DAO (S-DAO for short) message sent from the parent network node or the border router is received by each child network node along the packet forwarding path.

For example, one of scenarios in this embodiment of this application may be applied to a network topology structure in the TSCH mode shown in FIG. 1. It may be understood that the network topology structure in the TSCH mode is a destination-oriented directed acyclic graph (DODAG for short), and a root network node in the DODAG may be the border router (BR for short). The BR may be connected to a local network management device, or the BR may connect an external network and an external network management device by using a router. BRs may be connected to each other by using a subnet backbone, to expand a network coverage area.

In specific implementation, the local network management device or the external network management device may maintain a network resource database, and formulate a network resource scheduling solution. After joining the network, the border router may collect network information including the network resource scheduling solution. After the border router receives the network resource scheduling solution, the border router is responsible for delivering the network resource scheduling solution to each child network node, so as to implement centralized management and scheduling of network resources in the network topology structure.

The network topology structure shown in FIG. 1 is used as an example. Assuming that a packet forwarding path corresponding to a DAO message received and delivered by the BR is: a network node A→a network node B→a network node C, a specific solution may be as follows: The network node A receives the DAO message, and obtains target resource scheduling information 1 that is carried in the DAO message and that is used to indicate a cell that needs to be scheduled between the network node A and a next-hop network node (namely, the network node B). In this case, the network node A performs cell negotiation and scheduling (for example, may perform negotiation by using 6P transaction signaling and reply signaling) with the network node B based on the target resource scheduling information 1. If cell negotiation and scheduling succeed, the network node A sends the DAO message to the network node B. The network node B receives the DAO message, and obtains target resource scheduling information 2 that is carried in the DAO message and that is used to indicate a cell that needs to be scheduled between the network node B and a next-hop network node (namely, the network node C). In this case, the network node B performs cell negotiation and scheduling with the network node C based on the target scheduling information 2. If cell negotiation and scheduling succeed, the network node B sends the DAO message to the network node C. The network node C receives the DAO message, and learns that the network node C is an egress node. In this case, network resource scheduling on the packet forwarding path is completed.

Therefore, in this embodiment of this application, the DAO message may be delivered to each network node on the packet forwarding path, so that a network resource that needs to be scheduled between each pair of adjacent network nodes on a multi-hop path can be centrally scheduled, to reserve a network resource from a source end to a destination end on the multi-hop path, and help implement a deterministic latency of packet forwarding. In this embodiment of this application, the multi-hop path is a forwarding path on which at least one intermediate node is included between a source node and a destination node on the forwarding path.

It may be understood that the foregoing scenario is merely an example of a scenario provided in this embodiment of this application, and this embodiment of this application is not limited to this scenario.

With reference to accompanying drawings, the following uses an embodiment to describe in detail a specific implementation of the network resource scheduling method in this embodiment of this application.

Figures 2, 3:
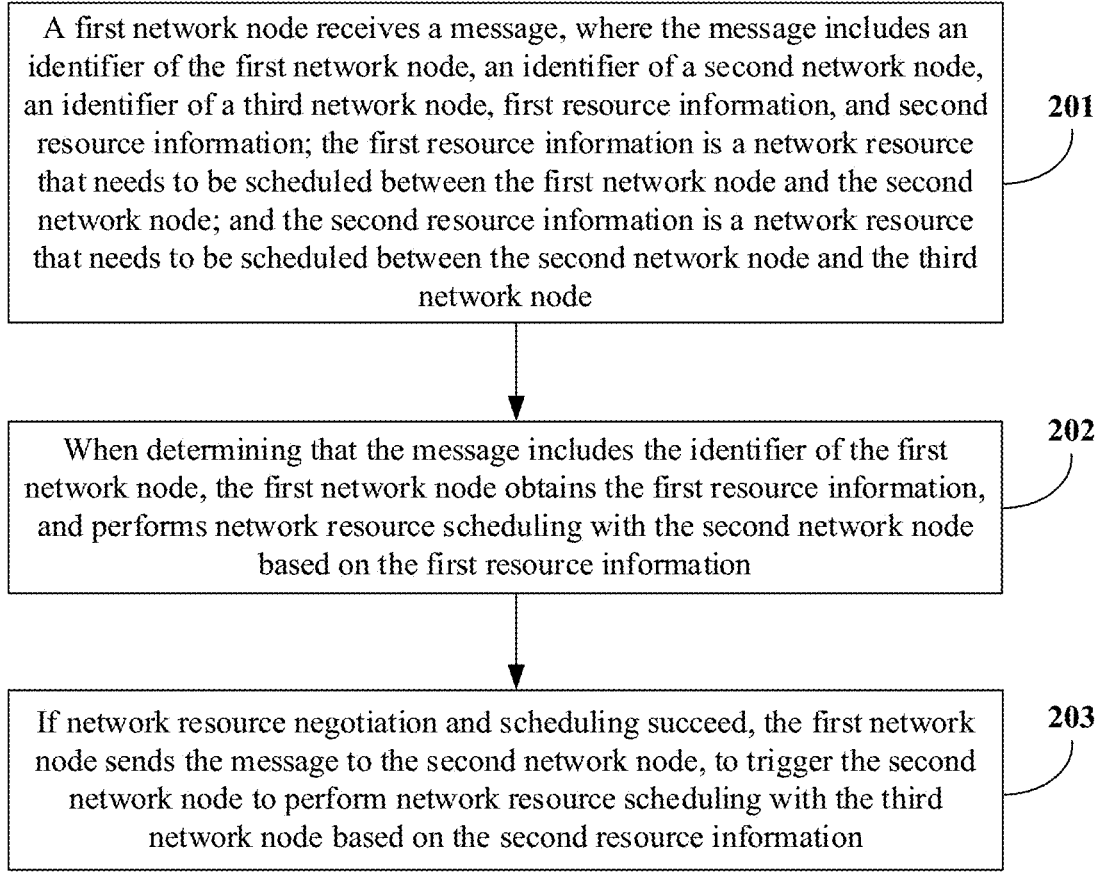
FIG. 2 is a schematic flowchart of a network resource scheduling method according to an embodiment of this application.
FIG. 3 is a schematic diagram of a format of a DAO message according to an embodiment of this application.

FIG. 2 is a schematic flowchart of a network resource scheduling method according to an embodiment of this application. The method may specifically include the following steps.

Step 201: A first network node receives a message, where the message includes an identifier of the first network node, an identifier of a second network node, an identifier of a third network node, first resource information, and second resource information; the first resource information is used to indicate a network resource that needs to be scheduled between the first network node and the second network node; and the second resource information is used to indicate a network resource that needs to be scheduled between the second network node and the third network node.

It may be understood that the message received by the first network node may be a DAO message used for scheduling. To make this embodiment more vivid, the DAO message is used as an example for description in this embodiment. The DAO message may be sent by a network management device (for example, a border router) and transmitted along a packet forwarding path, and the packet forwarding path includes at least the first network node, the second network node, and the third network node.

It may be understood that the first network node may be any network node other than an egress (Egress) node on the packet forwarding path, and on the packet forwarding path, a next-hop node of the first network node is the second network node, and a next-hop node of the second network node is the third network node. To be specific, the packet forwarding path may be: . . . →the first network node→the second network node→the third network node→ . . . , where the first network node may be an ingress (Ingress) node or an intermediate node, and the third network node may be the egress node or an intermediate node.

In specific implementation, a local network management device or an external network management device formulates a centralized scheduling policy corresponding to the network resource on the packet forwarding path and sends the centralized scheduling policy to a BR, and the BR encapsulates the centralized scheduling policy into the DAO message, and delivers the DAO message to each network node on the packet forwarding path along the packet forwarding path by using the ingress node, so that hop-by-hop network nodes successively complete network resource configuration. If some nodes prior to the packet forwarding path are included between the BR and the ingress node, these nodes are responsible for only forwarding the DAO message to the ingress node for current resource reservation, and do not perform operations performed by the first network node and the second network node.

It should be noted that that the BR delivers the DAO message is merely an example for description in this embodiment. In this embodiment of this application, any network management device that can deliver a DAO to implement centralized scheduling of the network resource can deliver the DAO message to each network node on the packet forwarding path.

It may be understood that for example, for a format of the DAO message, reference may be made to FIG. 3. Fields included in the DAO message and values and meanings of the fields are described as follows:

Type: Type is used to indicate a type of the message. In this embodiment, if Type=155, it indicates that the type of the message is a control type.

Code: Code is used to indicate that the message is the DAO message. If Code=0x04, it indicates that the message is an encrypted DAO message. If Code=0x84, it indicates that the message is an unencrypted DAO message. In actual application, Code may be assigned according to the internet assigned numbers authority (The Internet Assigned Numbers Authority, IANA for short) standard, and may be any value other than 0x00, 0x01, 0x02, 0x03, 0x80, 0x81, 0x82, 0x83, and 0x8A.

Checksum: Checksum is used during encryption, and is calculated according to the RFC4443 standard.

Security: Security is a field used when the DAO message is encrypted.

RPL Instance ID: RPL Instance ID may be an 8-bit RPL instance ID. In this embodiment of this application, the ID may be an ID of a border router, and is in a one-to-one correspondence with the border router.

K: K indicates whether the DAO message requires ACK, and may be set to 1 in this embodiment of this application.

D: D indicates whether the DAO message includes an ID of a DODAG, and may be set to 0 in this embodiment of this application.

DAO Sequence: DAO Sequence is a sequence number. Each time the border router sends a DAO message, the sequence number increases by 1. The sequence number is used to identify a correspondence between the DAO message and a reply message (namely, a DAO-ACK message) to the DAO message. The DAO message and the corresponding DAO-ACK message use a same sequence number, so that it can identify that the DAO-ACK message is a reply message to a specific DAO message.

Options: Options filed is an option sequence in the DAO message.

It may be understood that the options field in the DAO message may include an information sequence. The information sequence includes resource scheduling information corresponding to each network node on the packet forwarding path, and is used to indicate a network resource that needs to be scheduled between each node and a next-hop node of each node on the packet forwarding path. For example, the information sequence may include the first resource information and the second resource information. The first resource information may carry the network resource that needs to be scheduled between the first network node and the second network node, and the second resource information may carry the network resource that needs to be scheduled between the second network node and the third network node. In addition, the information sequence in the options field in the DAO message may further include an identifier of each network node on the packet forwarding path. For example, the information sequence may include the identifier of the first network node, the identifier of the second network node, and the identifier of the third network node. For detailed descriptions, refer to step 202.

Step 202: When determining that the message includes the identifier of the first network node, the first network node obtains the first resource information, and performs network resource scheduling with the second network node based on the first resource information.

It may be understood that the message received by the first network node includes the identifier of each network node on the forwarding path and a network resource that needs to be scheduled between two adjacent network nodes. In this case, if the first network node finds the identifier of the first network node from the message, it indicates that the first network node is a node on the forwarding path.

The first network node searches the information sequence carried in the DAO message for the first resource information. The information sequence is used to indicate the network resource that needs to be scheduled between each node and the next-hop node of each node on the packet forwarding path, and the first resource information is used to indicate the network resource that needs to be scheduled between the first network node and the second network node.

Figure 4:
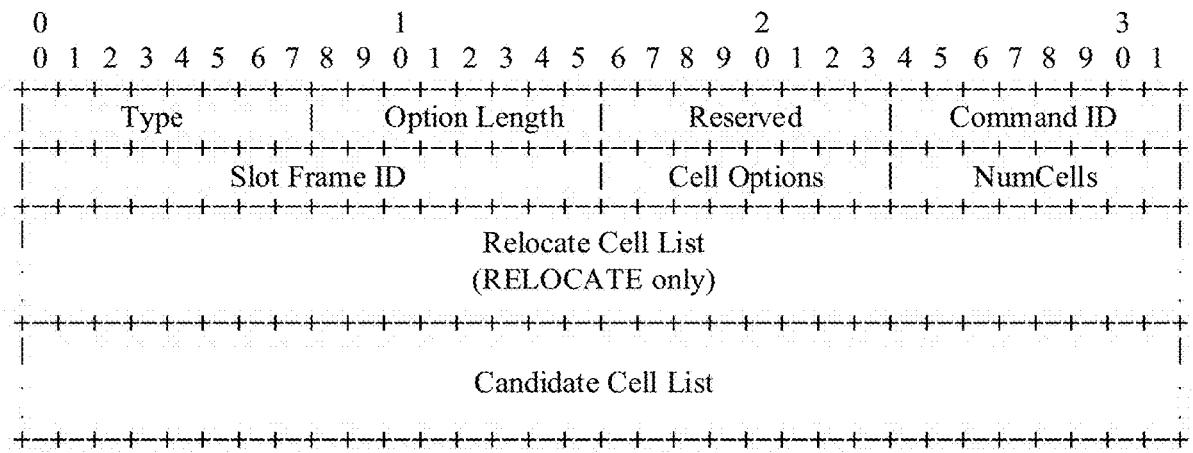
FIG. 4 is a schematic diagram of a format of a schedule reservation option field according to an embodiment of this application.

In specific implementation, the information sequence may be carried in the options field in the DAO message, and each piece of resource information in the information sequence may be carried in a schedule reservation option field in the options field. A format of the schedule reservation option field is shown in FIG. 4. Fields included in the schedule reservation option field and values and meanings of the fields are described as follows:

Command ID: Command ID is used to indicate a scheduling operation corresponding to each network node, and a specific value may be 1, 2, or 3. When Command ID=1, it indicates that a scheduling operation that needs to be performed is to add (Add) a cell of the network node. When Command ID=2, it indicates that a scheduling operation that needs to be performed is to delete (Delete) a cell of the network node. When Command ID=3, it indicates that a scheduling operation that needs to be performed is to relocate (Relocate) a cell of the network node.

Slot Frame ID: Slot Frame ID is used to identify a slot frame used during 6P transaction, in other words, is used to indicate an occasion of negotiation and scheduling.

Cell Options: Cell Options is used to identify a type of a cell that needs to be scheduled, and a specific value may be TX, RX, SHARED, or the like. When Cell Options=TX, it indicates that a cell used to send a packet needs to be scheduled. When Cell Options=RX, it indicates that a cell used to receive a packet needs to be scheduled. When Cell Options=SHARED, it indicates that a cell that can be used to send a packet and receive a packet needs to be scheduled.

NumCells: NumCells is used to indicate a quantity of cells that need to be added, deleted, or relocated.

Candidate Cell List: Candidate Cell List indicates a candidate cell list, and a quantity of cells in the candidate cell list is greater than or equal to a quantity of cells in NumCells.

Relocate Cell List: Relocate Cell List indicates a relocate cell list, and is valid only when Command ID indicates that the scheduling operation is to relocate the cell. A quantity of cells in the relocate cell list is equal to Num Cells.

It may be understood that all network nodes except the egress node on the packet forwarding path may find resource information corresponding to the network nodes from the information sequence in the DAO message, and when performing network resource scheduling, each network node needs to search a plurality of pieces of resource information in the DAO message for resource information uniquely corresponding to the network node. The resource information is denoted as target resource information of the network node. The options field in the DAO message may further include the identifier of each network node on the packet forwarding path, so that each network node on the packet forwarding path can find target resource information corresponding to the network node.

Figure 5:
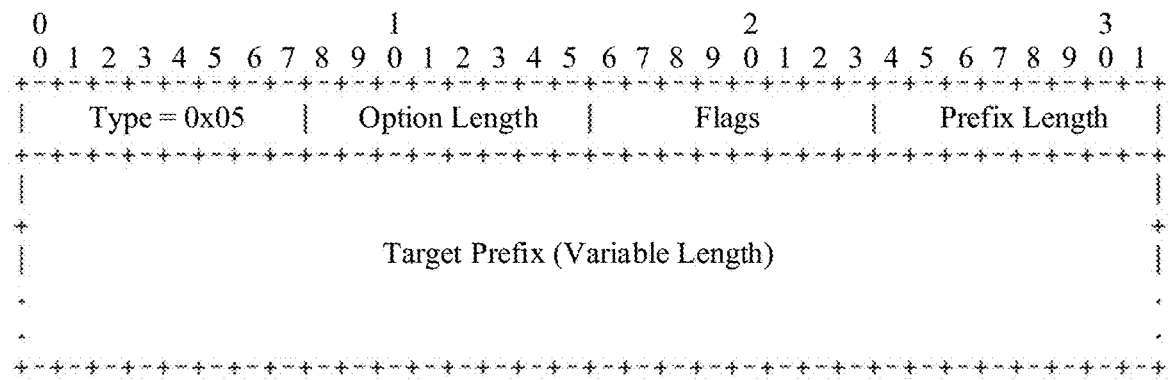
FIG. 5 is a schematic diagram of a format of a target option field according to an embodiment of this application.

In specific implementation, the identifier of each network node may be carried in a target option field in the options field in the DAO message. A format of the target option field is shown in FIG. 5. Fields included in the target option field and values and meanings of the fields are described as follows:

Type: Type is an identifier used to indicate that the field is the target option field, and Type may be set to 5 in this embodiment.

Option Length: Option Length is used to indicate a length of the target option field.

Prefix Length: Prefix Length is used to indicate a length of an IPv6 prefix. In this embodiment of this application, Prefix Length may be set to 128. This indicates a length of a 128-bit IPv6 address.

Target Prefix: In this embodiment of this application, Target Prefix is a 128-bit IPv6 address of the network node, and the IPv6 address is used as the identifier of the network node.

In specific implementation, in the DAO message received by each network node on the packet forwarding path, two conditions need to be considered for an arrangement order of resource information and an arrangement order of identifiers of network nodes. First, each network node may be enabled to find corresponding target resource information from the received DAO. Second, each network node may be enabled to determine a next-hop network node from the received DAO, to determine a target network node with which the network node needs to perform network resource negotiation and scheduling and to which the DAO is sent after negotiation and scheduling are completed.

In some possible implementations, the arrangement order of the resource information and the arrangement order of the identifiers of the network nodes that are in the DAO message may be specifically as follows: The identifiers of the network nodes are arranged in an order of the network nodes on the packet forwarding path, and resource information used to indicate a network resource used to forward a packet between two adjacent network nodes is located between identifiers of the two adjacent network nodes. For example, details may be as follows: The option field in the DAO message includes a target option field and a schedule reservation option field. One target option field carries an identifier of one network node on the packet forwarding path, and one schedule reservation option field carries resource information used to indicate a network resource that needs to be scheduled between one pair of adjacent network nodes.

In this case, for the first network node and the second network node that are adjacent to each other on the packet forwarding path, in the DAO message, the identifier of the first network node and the identifier of the second network node are arranged in an order of the first network node and the second network node on the packet forwarding path, and the first resource information found by the first network node is located between the identifier of the first network node and the identifier of the second network node. For example, the option field in the DAO message may include at least two target option fields and at least one schedule reservation option field. A first target option field carries the identifier of the first network node. A second target option field carries the identifier of the second network node. A target schedule reservation option field carries the first resource information, and the target schedule reservation option field is located between the first target option field and the second target option field. In this case, the DAO may include . . . , the first target option field, the target schedule reservation option field, the second target option field . . . .

Therefore, for the adjacent first network node, second network node, and third network node on the packet forwarding path, the option field in the message includes a first target option field, a second target option field, a third target option field, a first schedule reservation option field, and a second schedule reservation option field. The first target option field carries the identifier of the first network node, the second target option field carries the identifier of the second network node, the third target option field carries the identifier of the third network node, the first schedule reservation option field carries the first resource information, and the second schedule reservation option field carries the second resource information. In this case, the DAO may include . . . , the first target option field, the first schedule reservation option field, the second target option field, the second schedule reservation option field, the third target option field . . . .

For example, a specific form of the DAO message is described by using the packet forwarding path (that is, the network node A→the network node B→the network node C) in FIG. 1 as an example. An identifier of the network node A is carried in a target option A field, an identifier of the network node B is carried in a target option B field, an identifier of the network node C is carried in a target option C field, first resource information corresponding to the network node A is carried in a schedule reservation option 1 field, and second resource information corresponding to the network node B is carried in a schedule reservation option 2 field. In this case, the DAO message received by the network node on the packet forwarding path is shown in Table 1. Specifically, the target option A field, the schedule reservation option 1 field, the target option B field, the schedule reservation option 2 field, and the target option C field are included.

TABLE 1

| Information sequence in a DAO message |
| --- |
| Target option A |
| Schedule reservation option 1 |
| Target option B |
| Schedule reservation option 2 |
| Target option C |

In this case, after the first network node receives the DAO message, a possible specific implementation of step 202 may be as follows: The first network node searches the DAO message for a field that carries the identifier of the first network node, and obtains the first resource information of the first network node through parsing from a field next to the field that carries the identifier of the first network node. In addition, the first network node may further find, from the DAO message, a field next to the field that carries the first resource information of the first network node, and find an identifier of a next-hop network node (denoted as the second network node) of the first network node from the field, to determine the second network node.

For example, assuming that the network node A is the first network node, after receiving the DAO message shown in Table 1, the network node A may find the target option A field that carries the identifier of the network node A, and may obtain the first resource information corresponding to the network node A from a next schedule reservation option 1 field of the field. In addition, the network node A may further learn of the next-hop network node B (denoted as the second network node) from a next field of the field in which the first resource information is located, that is, determine that target resource scheduling information indicates a cell that needs to be scheduled between the network node A and a specific network node.

The first network node performs network resource negotiation and scheduling with the second network node based on the first resource information.

It may be understood that the first network node may perform network resource negotiation and scheduling with the second network node based on the obtained first resource information. Based on a 6top adaptation layer designed by the internet engineering task force (The Internet Engineering Task Force, IETF for short) 6TiSCH working group for a TSCH mode, network resource scheduling may be implemented at the 6top adaptation layer. In specific implementation, two adjacent network nodes invoke 6P transaction signaling at the 6top adaptation layer to add (Add), delete (Delete), or relocate (Relocate) a network resource.

Figure 6:
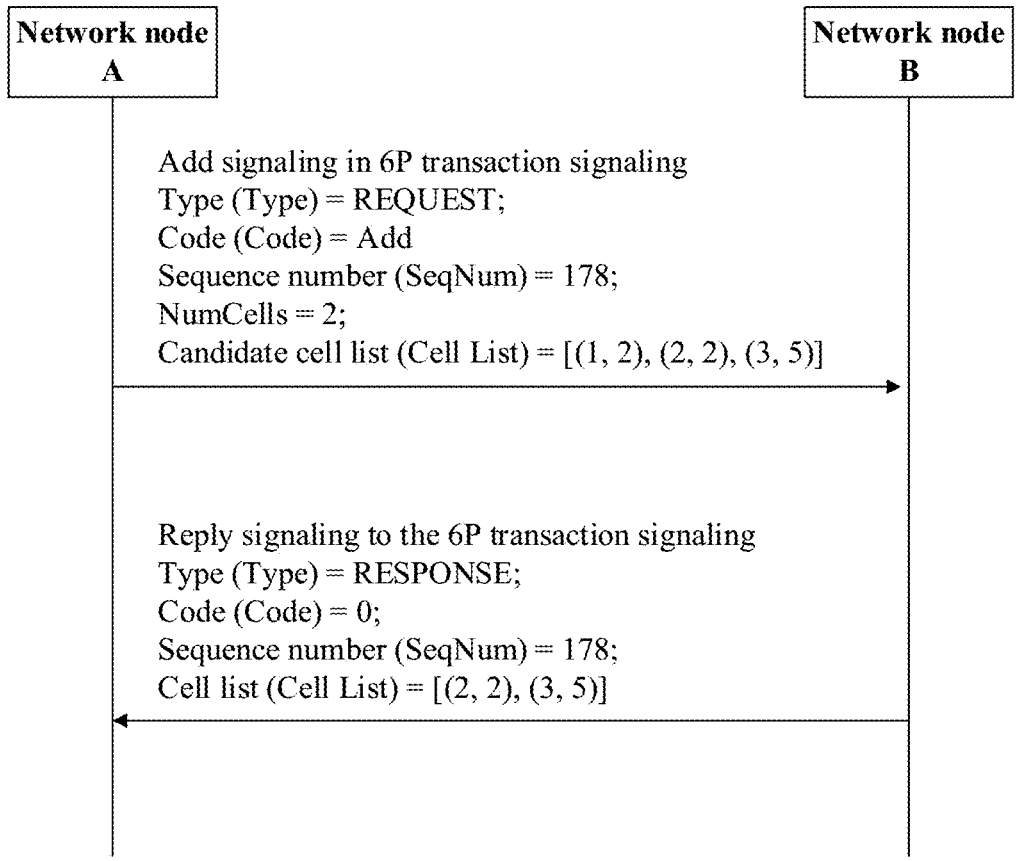
FIG. 6 is a schematic flowchart of negotiating and scheduling a cell by using 6P transaction signaling according to an embodiment of this application.

For a negotiation and scheduling process, refer to a negotiation procedure shown in FIG. 6. The negotiation procedure may specifically include: The first network node sends 6P transaction signaling to the second network node; and after receiving the 6P transaction signaling, the second network node generates 6P transaction reply signaling, and feeds back the 6P transaction reply signaling to the first network node, to complete network resource scheduling between the first network node and the second network node. For example, a network resource is added. As shown in FIG. 6, the network node A initiates Add signaling in the 6P transaction signaling to the network node B, to implement scheduling of adding two network resources between the network node A and the network node B. In one case, when the network node A receives no reply signaling to the Add signaling from the network node B within a preset time period, the network node A terminates this scheduling request. In another case, when the network node A receives reply signaling to the Add signaling from the network node B within a preset time period, the network node A and the network node B each receive/send a packet based on a configured network resource.

The Add signaling in the 6P transaction signaling may include Type, Code, a sequence number, NumCells, and a candidate cell list. Type is used to indicate that a message is request signaling for initiating scheduling. Code is used to indicate a specific operation of the scheduling, and the specific operation may include an add operation, a delete operation, or a relocate operation. The sequence number is used to determine a correspondence between a sent message and a reply message. NumCells is used to indicate a quantity of network resources corresponding to the operation indicated in Code. The candidate cell list is used to show a specific network resource that may be used as a candidate. Each network resource may be represented by using two-dimensional coordinates. One dimension represents a slot of the network resource, and the other dimension represents a channel of the network resource. For example, (1, 2), (2, 2), and (3, 5) are three different network resource identifiers. Similarly, the 6P transaction reply signaling may include Type, Code, a sequence number, and a cell list. Type is used to indicate that a message is reply signaling. Code is used to indicate a result of the scheduling operation, and the result may include a success or a failure. When Code =0, it indicates that network resource scheduling succeeds; or when Code=1, it indicates that network resource scheduling fails. The sequence number is used to determine a correspondence between a sent message and a reply message. The cell list is used to show a network resource configured after scheduling is completed, and the network resource may include some or all network resources in a candidate network resource list. To be specific, a quantity of cells in the candidate cell list in the request signaling is greater than or equal to a quantity of cells in the cell list in the reply signaling.

It should be noted that in the negotiation and scheduling process, all parameters in the 6P transaction signaling may be obtained from the DAO message. For example, the candidate cell list in the 6P transaction signaling may be obtained from the schedule reservation option field in the DAO message.

It may be understood that if Code in the 6P transaction reply signaling is equal to 0, it indicates that negotiation and scheduling between the first network node and the second network node succeed, and a cell of a next-hop network node may be scheduled; or if Code in the 6P transaction reply signaling is equal to 1, it indicates that negotiation and scheduling between the first network node and the second network node fail, it is considered that the centralized scheduling between the network nodes on the packet forwarding path is terminated, and scheduling to be performed with a next network node is not performed.

Step 203: If network resource negotiation and scheduling succeed, the first network node sends the message to the second network node, to trigger the second network node to perform network resource scheduling with the third network node based on the second resource information.

It may be understood that if negotiation and scheduling between the first network node and the second network node succeed, the first network node sends the message to the second network node. For an operation performed by the second network node after the second network node receives the message, refer to the step performed by the first network node after the first network node receives the message in step 202. Details are not described herein again.

In a possible implementation, if the 6P transaction reply signaling that is fed back by the second network node and that is received by the first network node indicates that network resource negotiation and scheduling between the first network node and the second network node succeed, the first network node may send the DAO message to the second network node adjacent to the first network node, so that the second network node performs network resource scheduling in the manner provided in this embodiment of this application.

In specific implementation, after network resource negotiation and scheduling between the first network node and the second network node succeed, the first network node may add a first indication identifier to the message, and send, to the second network node, the message to which the first indication identifier is added, to determine a successfully scheduled network resource. The first indication identifier is used to indicate that network resource scheduling between the first network node and the second network node succeeds.

In an example, after negotiation and scheduling succeed, the first resource information in the DAO message may be replaced with target scheduling confirmation information, and the target scheduling confirmation information is denoted as the first indication identifier. The target scheduling confirmation information is used to indicate that network resource scheduling between the first network node and the second network node succeeds, and the target scheduling confirmation information may include a list of successfully scheduled network resources. It may be understood that the successfully scheduled network resources are selected from candidate network resources.

Figure 7:
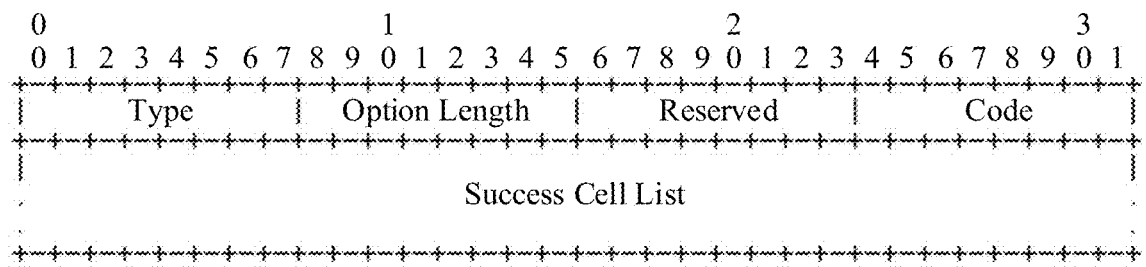
FIG. 7 is a schematic diagram of a format of a reservation confirmation option field according to an embodiment of this application.

It may be understood that if the first resource information is carried in a schedule reservation option field in an information sequence, the target scheduling confirmation information used as the first indication identifier may be correspondingly carried in a first reservation confirmation option field, and Code in the first reservation confirmation option field may be 0. This is used to indicate that the negotiation and scheduling result is "success". A format of the reservation confirmation option field is shown in FIG. 7. Fields included in the reservation confirmation option field and values and meanings of the fields are described as follows:

Code: Code is used to indicate a code returned during 6P transaction, and indicates success/failure. If Code=0, the target scheduling confirmation information may be correspondingly carried in the first reservation confirmation option field, and it indicates that 6P transaction negotiation and scheduling succeed; or if Code=1, it indicates that 6P transaction negotiation and scheduling fail, and target scheduling failure information may be correspondingly carried in a second reservation confirmation option field.

Success Cell List: Success Cell List is used to indicate a list of cells that are successfully negotiated and scheduled.

The first resource information obtained by the first network node in step 202 carries information used to indicate a to-be-scheduled candidate network resource, and after negotiation and scheduling succeed, the target scheduling confirmation information carries information used to indicate a successfully scheduled network resource. The successfully scheduled network resource is selected from the to-be-scheduled candidate network resource, and may be some or all cells in the to-be-scheduled candidate network resource. In an example, the information used to indicate the to-be-scheduled candidate network resource may be carried in a candidate cell list field in the schedule reservation option field in the information sequence, and the information used to indicate the successfully scheduled network resource may be carried in Success Cell List in the first reservation confirmation option field in the DAO message.

In specific implementation, after receiving the DAO message, the second network node may perform network resource scheduling with reference to the network resource scheduling solution that is provided in this embodiment of this application and that is performed by the first network node, and by analogy, until all the network nodes on the packet forwarding path successfully schedule the cell.

In an example, when an egress node receives the message (for example, the DAO message), it indicates that negotiation and scheduling performed by each hop network node on the packet forwarding path succeed, and a first indication identifier is correspondingly added to a network node other than the egress node on the packet forwarding path. For example, if all first resource information in the DAO message is replaced with scheduling confirmation information, the egress node on the packet forwarding path may encapsulate the scheduling confirmation information in the DAO message into a DAO-ACK message, and feed back the DAO-ACK message to a border router in a unicast manner.

Figure 8:
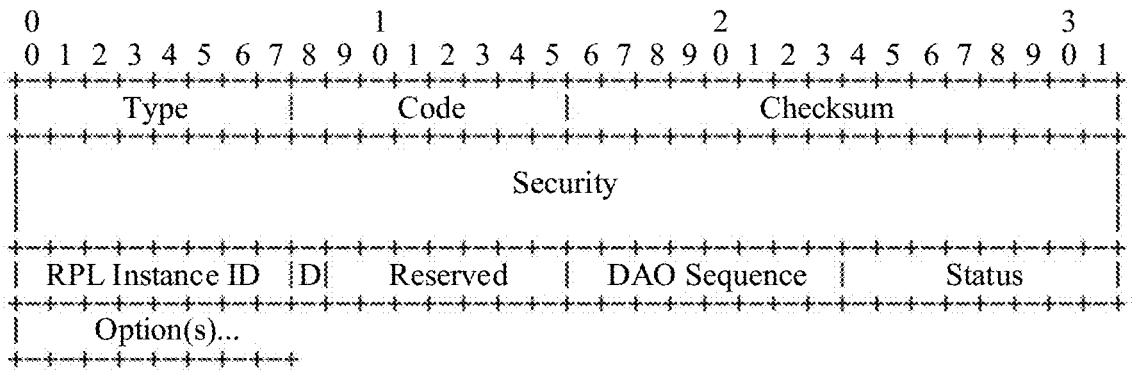
FIG. 8 is a schematic diagram of a format of a DAO-ACK message according to an embodiment of this application.

It may be understood that a format of the DAO-ACK message is shown in FIG. 8. Fields included in the DAO-ACK message and values and meanings of the fields are described as follows:

Type: Type is used to indicate a type of the message. In this embodiment, if Type=155, it indicates that the type of the message is a control type.

Code: Code is used to indicate that the message is the DAO-ACK message. If Code=0x05, it indicates that the message is an unencrypted DAO-ACK message. If Code=0x85, it indicates that the message is an encrypted S-DAO-ACK message.

For Security, RPL Instance ID, D, Reserved, DAO Sequence, and Options, refer to FIG. 3 and descriptions of the DAO.

In another possible implementation, if the 6P transaction reply signaling that is fed back by the second network node and that is received by the first network node indicates that network resource negotiation and scheduling between the first network node and the second network node fail, the first network node may add a second indication identifier to the message. For example, the first network node may replace the first resource information in the DAO message with target scheduling failure information, and encapsulate the target scheduling failure information into a DAO-NACK message and feed back the DAO-NACK message to the border router.

It may be understood that if the first resource information is carried in the schedule reservation option field in the DAO message, the target scheduling failure information used as the second indication identifier may be correspondingly carried in a second reservation confirmation option field in the DAO-NACK message, and Code in the second reservation confirmation option field may be 1. This is used to indicate that the negotiation and scheduling result is "failure". For a format of the reservation confirmation option field, refer to FIG. 7 and corresponding descriptions.

In specific implementation, after receiving the DAO-NACK message indicating that negotiation and scheduling fail, the first network node may replace the schedule reservation option field that carries the target resource scheduling information with the second reservation confirmation option field that carries a coordinated scheduling failure identifier. In this case, the first network node may encapsulate the second reservation confirmation option field that carries the target scheduling failure information into the DAO-NACK message, and feed back the DAO-NACK message to the border router in a unicast manner. For a format of the DAO-NACK message and related descriptions, refer to the foregoing format of the DAO-ACK message and the related descriptions of the DAO-ACK message. Details are not described herein again.

It can be learned that according to the network resource scheduling method provided in this embodiment of this application, the DAO message or the like is sent to each network node on the packet forwarding path, to initiate centralized scheduling of the network resource on the packet forwarding path. Each hop network node on the packet forwarding path may perform network resource negotiation and scheduling between the network node and a next-hop network node based on the corresponding first resource information in the DAO message, until network resource negotiation and scheduling on the packet forwarding path are completed. In this way, the DAO message may be delivered to each network node on the packet forwarding path, so that a network resource that needs to be scheduled between each pair of adjacent network nodes on a multi-hop path can be centrally scheduled, to implement end-to-end resource scheduling on the multi-hop path.

It should be noted that in some application scenarios of packet forwarding, there is a need to ensure that a time at which a packet is forwarded from a source end to a destination end meets a deterministic latency condition, that is, it is required that the packet needs to arrive at the destination end before a moment. However, in the network resource scheduling method provided in this embodiment of this application, the first resource information between the first network node and the second network node and the second resource information between the second network node and the third network node are centrally configured in a same message, and may have a specific association relationship. In this way, if a time sequence of network resources between network nodes can be strictly controlled, a fixed latency existing when each network node on the packet forwarding path forwards the packet by using the scheduled network resource can be ensured, to ensure that after scheduling is performed by using the network resource scheduling method provided in this embodiment of this application, each network node can complete end-to-end packet forwarding in a "deterministic latency".

In addition, the network resource scheduling method provided in this embodiment of this application is applicable to centralized scheduling of the network resource that needs to be scheduled between each pair of adjacent network nodes on the multi-hop path. In addition, in the scheduling method, there is no high requirement on a processing capability of the network node and stability of the network topology structure. Because the network node in the network topology structure in the TSCH mode does not have a strong processing capability and does not have a stable network topology structure, the network resource scheduling method provided in this embodiment of this application is very tailored to a requirement on the network resource scheduling solution in the network topology structure in the TSCH mode, and is a solution that is applicable to centralized scheduling of the network resource between each pair of adjacent network nodes on the packet forwarding path in the network topology structure in the TSCH mode.

After the network resource scheduling method provided in this embodiment of this application is described, the following clearly and completely describes, by using two instances, instances in which this embodiment of this application is applied to two scenarios: a scheduling success scenario and a scheduling failure scenario.

Instance 1: The packet forwarding path (that is, the network node A→the network node B→the network node C) in the scenario shown in FIG. 1 is used as an example. A specific process of a method for centrally scheduling a network bandwidth resource, namely, a cell may include the following steps.

First part: Cell scheduling is performed between the network node A and the network node B.

S11: The BR sends the DAO message that carries the information sequence shown in Table 1 to the network node A.

S12: The network node A finds, from the received DAO message, that an identifier of the network node A is carried in the $1^{st}$ target option A field.

S13: The network node A obtains, from the DAO message, a schedule reservation option 1 field and a target option B field that are after the target option A field, obtains first resource information from the schedule reservation option 1 field through parsing, and determines, from the target option B field, that a next-hop network node is the network node B.

S14: The network node A sends 6P transaction signaling to the network node B based on the first resource information.

S15: The network node B feeds back 6P transaction reply signaling, where the reply signaling indicates that negotiation and scheduling succeed.

S16: The network node A replaces the schedule reservation option 1 field that is in the DAO message and that carries the first resource information with a reservation confirmation option 1 field that carries target scheduling confirmation information 1, where Code included in the reservation confirmation option 1 field is equal to 0. This indicates that the negotiation and scheduling result is "success" (Success), and a DAO message shown in Table 2 is formed.

TABLE 2

Information sequence in a DAO message

Target option A
Reservation confirmation option 1 (Success)
Target option B
Schedule reservation option 2
Target option C S17: The network node A sends the DAO message that carries the information sequence shown in Table 2 to the network node B.

Second part: Cell scheduling is performed between the network node B and the network node C.

S21: The network node B finds, from the received DAO message sent by the network node A, a target option B field that carries an identifier of the network node B.

S22: The network node B obtains, from the S-DAO message, a schedule reservation option 2 field and a target option C field that are after the target option B field, obtains second resource information from the schedule reservation option 2 field through parsing, and determines, from the target option C field, that a next-hop network node is the network node C.

S23: The network node B sends 6P transaction signaling to the network node C based on the second resource information.

S24: The network node C feeds back 6P transaction reply signaling, where the reply signaling indicates that negotiation and scheduling succeed.

S25: The network node B replaces the schedule reservation option 2 field that is in the S-DAO message and that carries the second resource information with a reservation confirmation option 2 field that carries target scheduling confirmation information 2, where Code included in the reservation confirmation option 2 field is equal to 0. This indicates that the negotiation and scheduling result is "success" (Success), and a DAO message shown in Table 3 is formed.

S26: The network node B sends the DAO message that carries the information sequence shown in Table 3 to the network node C.

Third part: Operations are performed by the network node C.

S31: The network node C finds, from the received DAO message, that an identifier of the network node C is carried in the last target option C field, and determines that the network node C is an egress node.

S32: The network node C encapsulates the scheduling confirmation information in the DAO message into a DAO-ACK message, and feeds back the DAO-ACK message to a border router in a unicast manner.

TABLE 3

Information sequence in a DAO message

Target option A
Reservation confirmation option 1 (Success)
Target option B
Reservation confirmation option 2 (Success)
Target option C It may be understood that after the border router receives the DAO-ACK message sent by the egress node, it is considered that the centralized cell scheduling on the packet forwarding path: the network node A→the network node B→the network node C is completed.

Instance 2: The packet forwarding path (that is, the network node A→the network node B→the network node C) in the scenario shown in FIG. 1 is still used as an example. A specific process of a method for centrally scheduling a cell may include the following steps.

First part: Cell scheduling is performed between the network node A and the network node B.

S11': The BR sends the DAO message that carries the information sequence shown in Table 1 to the network node A.

S12': The network node A finds, from the received S-DAO message, that an identifier of the network node A is carried in the 1$^{st}$ target option A field.

S13': The network node A obtains, from the S-DAO message, a schedule reservation option 1 field and a target option B field that are after the target option A field, obtains first resource information from the schedule reservation option 1 field through parsing, and determines, from the target option B field, that a next-hop network node is the network node B.

S14': The network node A sends 6P transaction signaling to the network node B based on the first resource information.

S15': The network node B feeds back 6P transaction reply signaling, where the reply signaling indicates that negotiation and scheduling succeed.

S16': The network node A replaces the schedule reservation option 1 field that is in the DAO message and that carries the first resource information with a reservation confirmation option 1 field that carries target scheduling confirmation information 1, where Code included in the reservation confirmation option 1 field is equal to 0. This indicates that the negotiation and scheduling result is "success" (Success), and a DAO message shown in Table 2 is formed.

S17': The network node A sends the DAO message that carries the option sequence field shown in Table 2 to the network node B.

Second part: Cell scheduling is performed between the network node B and the network node C.

S21': The network node B finds, from the received DAO message sent by the network node A, a target option B field that carries an identifier of the network node B.

S22': The network node B obtains, from the DAO message, a schedule reservation option 2 field and a target option C field that are after the target option B field, obtains second resource information from the schedule reservation option 2 field through parsing, and determines, from the target option C field, that a next-hop network node is the network node C.

S23': The network node B sends 6P transaction signaling to the network node C based on the second resource information.

S24': The network node C feeds back 6P transaction reply signaling, where the reply signaling indicates that negotiation and scheduling succeed.

S25': The network node B replaces the schedule reservation option 2 field that is in the DAO message and that carries the second resource information with a reservation confirmation option 3 field that carries target scheduling failure information 2, where Code included in the reservation confirmation option 2 field is equal to 1. This indicates that the negotiation and scheduling result is "failure" (Failure), and a DAO message shown in Table 4 is formed.

TABLE 4

DAO option sequence

Target option A
Reservation confirmation option 1 (Success)
Target option B
Reservation confirmation option 3 (Failure)
Target option C S26': The network node B encapsulates the target scheduling failure information in the DAO message into a DAO-NACK message, and feeds back the DAO-NACK message to a border router in a unicast manner.

It may be understood that after the border router receives the DAO-NACK message sent by an intermediate node, it may be considered that the centralized cell scheduling on the packet forwarding path: the network node A→the network node B→the network node C is completed.

Therefore, after the border router receives a response message (including the DAO-ACK message and the DAO-NACK message) that is to the DAO message and that is sent by the egress node or the intermediate node, it may be considered that centralized cell scheduling between the network nodes on the packet forwarding path is completed.

Figure 9:
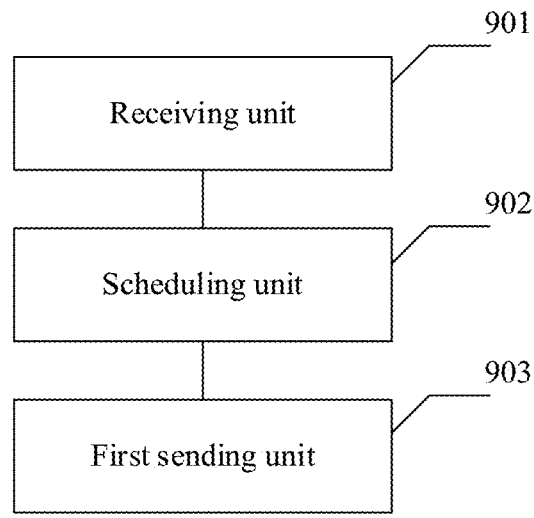
FIG. 9 is a schematic structural diagram of a network node according to an embodiment of this application.

In addition, an embodiment of this application further provides a network node. FIG. 9 is a schematic structural diagram of the network node. The network node is a first network node, and includes:

a receiving unit 901, configured to receive a message, where the message includes an identifier of the first network node, an identifier of a second network node, an identifier of a third network node, first resource information, and second resource information; the first resource information is used to indicate a network resource that needs to be scheduled between the first network node and the second network node; and the second resource information is used to indicate a network resource that needs to be scheduled between the second network node and the third network node;

a scheduling unit 902, configured to: when the first network node determines that the message includes the identifier of the first network node, obtain the first resource information, and perform network resource scheduling with the second network node based on the first resource information; and a first sending unit 903, configured to send a message to the second network node, to trigger the second network node to perform network resource scheduling with the third network node based on the second resource information.

In some possible implementations, the first sending unit 903 may include:

an adding subunit, configured to add a first indication identifier to the message after the first network node determines that network resource scheduling between the first network node and the second network node succeeds; and a sending subunit, configured to send, to the second network node, the message to which the first indication identifier is added, where the first indication identifier is used to indicate that network resource scheduling between the first network node and the second network node succeeds.

In an implementation, if the third network node is an egress node on a packet forwarding path, the message is sent to the third network node and then is sent by the third network node to a network management device.

The first resource information is specifically used to indicate a candidate network resource that needs to be scheduled between the first network node and the second network node, the first indication identifier is further used to indicate a network resource that is successfully scheduled between the first network node and the second network node, and the successfully scheduled network resource is selected from the candidate network resource.

In specific implementation, the network node may further include: a second sending unit, configured to: after it is determined that network resource scheduling between the first network node and the second network node fails, add a second indication identifier to the message, and send, to the network management device, the message to which the second indication identifier is added, where the second indication identifier is used to indicate that network resource scheduling between the second network node and the second network node fails.

The message in this embodiment of this application may be a destination advertisement object DAO message.

In an example, the identifier of the first network node, the identifier of the second network node, the identifier of the third network node, the first resource information, and the second resource information are all carried in an option field in the DAO message.

In specific implementation, the option field includes a first target option field, a second target option field, a third target option field, a first schedule reservation option field, and a second schedule reservation option field. The first schedule reservation option field is located between the first target option field and the second target option field, and the second schedule reservation option field is located between the second target option field and the third target option field. The first target option field carries the identifier of the first network node, the second target option field carries the identifier of the second network node, the third target option field carries the identifier of the third network node, the first schedule reservation option field carries the first resource information, and the second schedule reservation option field carries the second resource information.

The foregoing describes the network node provided in this embodiment of this application. For a specific implementation, refer to the description in the foregoing embodiment of the network resource scheduling method corresponding to FIG. 2. An effect achieved in this embodiment is the same as that achieved in the foregoing method embodiment. Details are not described herein again.

Figure 10:
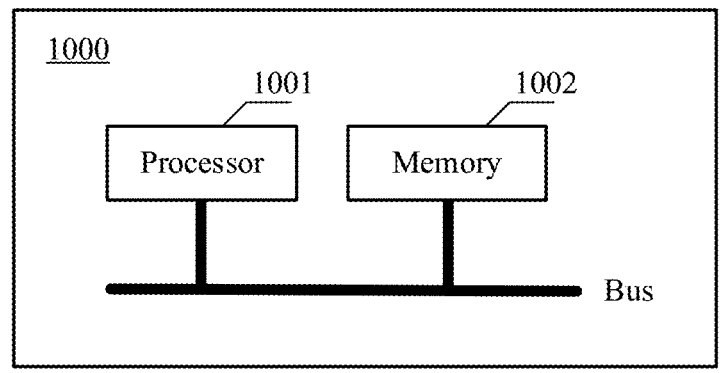
FIG. 10 is a schematic structural diagram of a network node according to an embodiment of this application.

In addition, FIG. 10 is a schematic structural diagram of a network node according to an embodiment of this application. The network node 1000 includes at least one connected processor 1001 and a memory 1002. The memory 1002 is configured to store program code, and the processor 1001 is configured to invoke the program code in the memory to perform the network resource scheduling method shown in FIG. 2.

In addition, an embodiment of this application further provides a computer readable storage medium, including an instruction. When the instruction is run on a computer, the computer is enabled to perform the network resource scheduling method corresponding to FIG. 2.

In addition, an embodiment of this application further provides a computer program product including an instruction. When the computer program product is run on a computer, the computer is enabled to perform the network resource scheduling method corresponding to FIG. 2.

"First" in names such as the "first network node" and the "first resource information" mentioned in this embodiment of this application is merely used as a name identifier, but does not represent first in sequence. This rule is also applicable to "second" and the like.

It can be learned from the foregoing descriptions of the implementations that a person skilled in the art may clearly understand that some or all steps of the methods in the embodiments may be implemented by software in addition to a universal hardware platform. Based on such an understanding, the technical solutions of this application may be implemented in a form of a computer software product. The computer software product may be stored in a storage medium, for example, a read-only memory (ROM)/RAM, a magnetic disk, or an optical disc, and includes several instructions for instructing a computer device (which may be a personal computer, a server, or a network communications device such as a router) to perform the methods in the embodiments or some parts of the embodiments of this application.

The embodiments in this specification are all described in a progressive manner, for same or similar parts in the embodiments, reference may be made to these embodiments, and each embodiment focuses on a difference from other embodiments. Especially, a network node embodiment is basically similar to a method embodiment, and therefore is described briefly. For related parts, refer to partial descriptions in the method embodiments. The described network node embodiment is merely an example. The modules described as separate parts may or may not be physically separate, and parts displayed as modules may or may not be physical modules, and may be located in one position, or may be distributed on a plurality of network units. Some or all the modules may be selected based on an actual requirement to achieve the objectives of the solutions of the embodiments. A person of ordinary skill in the art may understand and implement the embodiments without creative efforts.

The foregoing descriptions are merely example implementations of this application, but are not intended to limit the protection scope of this application.

What is claimed is:

1. A network resource scheduling method, comprising:
receiving, by a first network node, a message, wherein the message comprises an identifier of the first network node, an identifier of a second network node, an identifier of a third network node, first resource information, and second resource information; the first resource information is used to indicate a network resource that needs to be scheduled between the first network node and the second network node; and the second resource information is used to indicate a network resource that needs to be scheduled between the second network node and the third network node;
when determining that the message comprises the identifier of the first network node, obtaining, by the first network node, the first resource information, and performing network resource scheduling with the second network node based on the first resource information; and
sending, by the first network node, the message to the second network node, to trigger the second network node to perform network resource scheduling with the third network node based on the second resource information.

2. The method according to claim 1, wherein the sending, by the first network node, the message to the second network node comprises:
after determining that the network resource scheduling between the first network node and the second network node succeeds, adding, by the first network node, a first indication identifier to the message, and sending, to the second network node, the message to which the first indication identifier is added, wherein the first indication identifier is used to indicate that the network resource scheduling between the first network node and the second network node succeeds.

3. The method according to claim 1, wherein if the third network node is an egress node on a packet forwarding path, the message is sent to the third network node to be forwarded by the third network node to a network management device.

4. The method according to claim 2, wherein the first resource information is used to indicate a candidate network resource that needs to be scheduled between the first network node and the second network node, the first indication identifier is further used to indicate a network resource that is successfully scheduled between the first network node and the second network node, and the successfully scheduled network resource is selected from the candidate network resource.

5. The method according to claim 1, further comprising:
after determining that the network resource scheduling between the first network node and the second network node fails, adding, by the first network node, a second indication identifier to the message, and sending, to the network management device, the message to which the second indication identifier is added, wherein the second indication identifier is used to indicate that the network resource scheduling between the first network node and the second network node fails.

6. The method according to claim 1, wherein the message is a destination advertisement object (DAO) message.

7. The method according to claim 6, wherein the identifier of the first network node, the identifier of the second network node, the identifier of the third network node, the first resource information, and the second resource information are all carried in an option field in the DAO message.

8. The method according to claim 7, wherein the option field comprises a first target option field, a second target option field, a third target option field, a first schedule reservation option field, and a second schedule reservation option field;
the first schedule reservation option field is located between the first target option field and the second target option field, and the second schedule reservation option field is located between the second target option field and the third target option field; and
the first target option field carries the identifier of the first network node, the second target option field carries the identifier of the second network node, the third target option field carries the identifier of the third network node, the first schedule reservation option field carries the first resource information, and the second schedule reservation option field carries the second resource information.

9. A non-transitory computer readable storage medium, comprising instructions, wherein when the instructions are executed by a computer, the computer is enabled to perform the method according to claim 1.

10. A network node, wherein the network node is a first network node, and comprises:
at least one processor; and
one or more memories coupled to the at least one processor and storing instructions for execution by the at least one processor, the instructions instruct the at least one processor to cause the first network node to:
receive a message, wherein the message comprises an identifier of the first network node, an identifier of a second network node, an identifier of a third network node, first resource information, and second resource information; the first resource information is used to indicate a network resource that needs to be scheduled between the first network node and the second network node; and the second resource information is used to indicate a network resource that needs to be scheduled between the second network node and the third network node;
when determining that the message comprises the identifier of the first network node, obtain the first resource information, and perform network resource scheduling with the second network node based on the first resource information; and
send the message to the second network node, to trigger the second network node to perform network resource scheduling with the third network node based on the second resource information.

11. The network node according to claim 10, wherein the instructions instruct the at least one processor to cause the first network node to:
add a first indication identifier to the message after it is determined that the network resource scheduling between the first network node and the second network node succeeds; and
send, to the second network node, the message to which the first indication identifier is added, wherein the first indication identifier is used to indicate that the network resource scheduling between the first network node and the second network node succeeds.

12. The network node according to claim 10, wherein if the third network node is an egress node on a packet forwarding path, the message is sent to the third network node and then is sent by the third network node to a network management device.

13. The network node according to claim 11, wherein the first resource information is used to indicate a candidate network resource that needs to be scheduled between the first network node and the second network node, the first indication identifier is further used to indicate a network resource that is successfully scheduled between the first network node and the second network node, and the successfully scheduled network resource is selected from the candidate network resource.

14. The network node according to claim 10, wherein the instructions further instruct the at least one processor to cause the first network node to:
after it is determined that the network resource scheduling between the first network node and the second network node fails, add a second indication identifier to the message, and send, to the network management device, the message to which the second indication identifier is added, wherein the second indication identifier is used to indicate that the network resource scheduling between the second network node and the second network node fails.

15. The network node according to claim 10, wherein the message is a destination advertisement object (DAO) message.

16. The network node according to claim 15, wherein the identifier of the first network node, the identifier of the second network node, the identifier of the third network node, the first resource information, and the second resource information are all carried in an option field in the DAO message.

17. The network node according to claim 16, wherein the option field comprises a first target option field, a second target option field, a third target option field, a first schedule reservation option field, and a second schedule reservation option field;
the first schedule reservation option field is located between the first target option field and the second target option field, and the second schedule reservation option field is located between the second target option field and the third target option field; and the first target option field carries the identifier of the first network node, the second target option field carries the identifier of the second network node, the third target option field carries the identifier of the third network node, the first schedule reservation option field carries the first resource information, and the second schedule reservation option field carries the second resource information.

* * * * *